(12) United States Patent
Tomooka et al.

(10) Patent No.: US 11,599,230 B2
(45) Date of Patent: Mar. 7, 2023

(54) TOUCH SENSOR, ELECTRONIC DEVICE, AND METHOD OF PRODUCING TOUCH SENSOR

(71) Applicant: SEKISUI POLYMATECH CO., LTD., Saitama (JP)

(72) Inventors: Shinichi Tomooka, Saitama (JP); Yasushi Sakai, Saitama (JP)

(73) Assignee: SEKISUI POLYMATECH CO., LTD., Saitama (JP)

( * ) Notice: Subject to any disclaimer, the term of this patent is extended or adjusted under 35 U.S.C. 154(b) by 0 days.

(21) Appl. No.: 17/641,001

(22) PCT Filed: Sep. 25, 2020

(86) PCT No.: PCT/JP2020/036256
§ 371 (c)(1),
(2) Date: Mar. 7, 2022

(87) PCT Pub. No.: WO2021/065715
PCT Pub. Date: Apr. 8, 2021

(65) Prior Publication Data
US 2022/0269371 A1 Aug. 25, 2022

(30) Foreign Application Priority Data
Oct. 1, 2019 (JP) .............................. JP2019-181405

(51) Int. Cl.
*G06F 3/044* (2006.01)
*G06F 3/041* (2006.01)

(52) U.S. Cl.
CPC .. *G06F 3/0443* (2019.05); *G06F 2203/04103* (2013.01)

(58) Field of Classification Search
None
See application file for complete search history.

(56) References Cited

U.S. PATENT DOCUMENTS

2006/0270236 A1* 11/2006 Kusumoto .......... H01L 27/1266
438/692
2016/0162062 A1 6/2016 Furukawa et al.
(Continued)

FOREIGN PATENT DOCUMENTS

CN 105359071 A 2/2016
CN 106687896 A 5/2017
(Continued)

OTHER PUBLICATIONS

International Search Report for PCT Patent App. No. PCT/JP2020/036256 (dated Dec. 15, 2020).

*Primary Examiner* — Duane N Taylor, Jr.
(74) *Attorney, Agent, or Firm* — Cermak Nakajima & McGowan LLP; Tomoko Nakajima (57) ABSTRACT

To provide a touch sensor including a tail having a terminal protective layer that allows smooth insertion into or removal from a circuit board without causing any problem, which is likely to occur in a typical terminal protective layer provided on a terminal at a distal end of a tail of a touch sensor used for, for example, input operations of various electronic devices. A touch sensor having a plurality of sensor electrodes and a plurality of wires on a single substrate film includes a body including a flat portion and a deformed portion, which is three-dimensionally shaped relative to the flat portion surrounding the deformed portion and has an operation surface having the sensor electrodes, and a tail projecting from the body and having a terminal to connect the wires to a circuit board. The terminal has a terminal protective layer protecting the wires.

14 Claims, 4 Drawing Sheets

(56) References Cited

U.S. PATENT DOCUMENTS

2017/0139511 A1    5/2017   Ohsawa et al.
2017/0262098 A1    9/2017   Ohsawa
2017/0277306 A1    9/2017   Hondo et al.
2020/0175901 A1*   6/2020   Lee .................... G06F 3/04164
2021/0403769 A1*   12/2021   Kiyoto .................. G06F 3/041

FOREIGN PATENT DOCUMENTS

| CN | 106796477 A | 5/2017 |
| JP | 2015-114793 A | 6/2015 |
| JP | 2017-220103 A | 12/2017 |
| WO | 2013/058708 A1 | 4/2013 |
| WO | WO2015/147323 A1 | 10/2015 |

* cited by examiner

TOUCH SENSOR, ELECTRONIC DEVICE, AND METHOD OF PRODUCING TOUCH SENSOR

This application is a national phase entry under 35 U.S.C. § 371 of PCT Patent Application No. PCT/JP2020/036256, filed on Sep. 25, 2020, which claims priority under 35 U.S.C. § 119 to Japanese Patent Application No. 2019-181405, filed Oct. 1, 2019, both of which are incorporated by reference.

TECHNICAL FIELD

The present invention relates to a touch sensor that is used for, for example, input operations of various electronic devices, an electronic device including the touch sensor, and a method of producing the touch sensor.

BACKGROUND ART

Touch sensors are used for input operations of various electronic devices. Such a touch sensor includes a substrate formed from a resin film, a portion that serves as a detection region having sensor electrodes, and a tail that is a portion in which wires extending from the detection region are bundled. The tail has, at its distal end, a terminal that can be inserted into or removed from a circuit board, which is a separate member. The terminal is inserted into the circuit board for conductive connection. The terminal has a surface typically covered with a conductive carbon layer, serving as a terminal protective layer. Such a technique is described in, for example, Domestic Re-publication of PCT International Publication for Patent Application No. WO 2015/147323 (PTL 1).

CITATION LIST

Patent Literature

PTL 1: Domestic Re-publication of PCT International Publication for Patent Application No. WO 2015/147323

SUMMARY OF INVENTION

Technical Problem

A carbon layer is provided on a tail of a touch sensor such that segments of the carbon layer cover individual wires in the tail, which is generally thin in shape, to prevent electrical communication between the wires that are adjacent to each other. The segments of the carbon layer, which is formed from a thin coating layer, are arranged at a fine pitch. In a touch sensor as a final product, the carbon layer may have a defect, such as a crack or a too large pitch of the wires, caused depending on the manner of producing the touch sensor.

The present application discloses a touch sensor with little or no defect in a terminal protective layer provided on a terminal at a distal end of a tail.

Solution to Problem

One aspect of the present invention provides a touch sensor having a plurality of sensor electrodes and a plurality of wires on a substrate film, the touch sensor including a body that includes a three-dimensionally shaped input detection portion in which the sensor electrodes are arranged and a tail that projects from the body and has a terminal to connect the wires to a connection target. The terminal has a terminal protective layer protecting the wires. The substrate film includes a part T1 located within the terminal and having a thickness t1, and the thickness t1 is a maximum thickness of the entire substrate film.

According to this aspect of the present invention, the touch sensor having the sensor electrodes and the wires on the substrate film includes the body including the three-dimensionally shaped input detection portion, in which the sensor electrodes are arranged, and the tail projecting from the body and having the terminal to connect the wires to the connection target. In the touch sensor with such a configuration, the portion in which the sensor electrodes are arranged serves as a detection region, which a user can touch with a finger or any other object to perform an input operation. Since the terminal has the terminal protective layer protecting the wires, the wires can be protected at the terminal to connect to the connection target. The thickness t1 of the part T1, of the substrate film, located within the terminal is a maximum thickness of the entire substrate film. This causes the part of the substrate film at the terminal to be less elongated than other parts of the substrate film. This results in little elongation of the wires and the wire protective layer at the terminal. Thus, the touch sensor has the terminal with little or no crack and little or no increase in wire pitch.

One aspect of the present invention provides a touch sensor having a plurality of sensor electrodes and a plurality of wires on a substrate film, the touch sensor including a body that includes a three-dimensionally shaped input detection portion in which the sensor electrodes are arranged and a tail that projects from the body and has a terminal to connect the wires to a connection target. The terminal has a terminal protective layer protecting the wires. The substrate film includes a part T1 located within the terminal and having a thickness t1 and a flat part T0 other than the part T1, which is located within the terminal, and having a maximum thickness, and a difference between the thickness t1 and a thickness t0 at any position of the flat part T0 is less than or equal to 10%.

According to this aspect of the present invention, the touch sensor having the sensor electrodes and the wires on the substrate film includes the body including the three-dimensionally shaped input detection portion, in which the sensor electrodes are arranged, and the tail projecting from the body and having the terminal to connect the wires to the connection target. In the touch sensor with such a configuration, the portion in which the sensor electrodes are arranged serves as a detection region, which a user can touch with a finger or any other object to perform an input operation. Since the terminal has the terminal protective layer protecting the wires, the wires can be protected at the terminal to connect to the connection target. The difference between the thickness t1 of the part T1, of the substrate film, located within the terminal and the thickness t0 at any position of the flat part T0, which is other than the part T1 and has a maximum thickness, is less than or equal to 10%. This results in little elongation of the part of the substrate film at the terminal and also results in little elongation of the wires and the wire protective layer at the terminal. Thus, the touch sensor has the terminal with little or no crack and little or no increase in wire pitch. The term "any position of the flat part T0, which is other than the part T1 and has a maximum thickness" as used herein refers to any part of the substrate film that is located in the flat part other than the terminal and that has a maximum thickness. The difference in thickness between the part, of the substrate film, located within the terminal and any part, of the substrate film, having a maximum thickness and serving as a reference is less than or equal to 10%.

In this aspect of the present invention, the touch sensor may further include a side wall located between the body and the tail and raised from the tail. According to this aspect of the present invention, the touch sensor includes the side wall located between the body and the tail and raised from the tail to the body. Such a configuration enables the body having an operation surface to be at a higher level than the tail. This can provide a space under a rear surface opposite the operation surface, so that the tail can be folded and received in the space, or alternatively, any other component can be received in the space. This configuration allows the surface of the touch panel to be decorative unlike a simple flat surface, leading to good appearance in design of the touch panel.

In this aspect of the present invention, the substrate film may include the part T1 located within the terminal and having the thickness t1, a part T2 located in the tail and 5 mm apart from the boundary between the tail and the body and having a thickness t2, and a part T3 located at the side wall and having a thickness t3, and the thickness t1 may be greater than the thicknesses t2 and t3.

According to this aspect of the present invention, the substrate film includes the part T1 located within the terminal and having the thickness t1, the part T2 located in the tail and 5 mm apart from the boundary between the tail and the body and having the thickness t2, and the part T3 located at the side wall and having the thickness t3, and the thickness t1 is greater than the thicknesses t2 and t3. Such a configuration of the touch sensor results in little elongation of the part of the substrate film at the terminal and also results in little elongation of the wires and the wire protective layer at the terminal. Thus, the touch sensor has the terminal with little or no crack and little or no increase in wire pitch.

In this aspect of the present invention, the touch sensor may further include an insulating resist layer covering the wires arranged on the tail other than the terminal. According to this aspect, the wires arranged on the tail other than the terminal are covered by the insulating resist layer. Such a configuration eliminates or minimizes corrosion, cracking, and dislodgement of the wires.

In this aspect of the present invention, the terminal protective layer may be a carbon layer containing conductive carbon powder and having a pencil hardness of 2H or higher. According to this aspect, the terminal protective layer is formed from a carbon layer containing conductive carbon powder and having a pencil hardness of 2H or higher. Such a configuration protects the wires at the terminal, thus reducing the likelihood that the wires may wear down or be dislodged when the terminal is inserted into or removed from the circuit board.

In this aspect of the present invention, the wires may be formed from a conductive coating layer containing a silver filler. According to this aspect, the wires are formed from a conductive coating layer containing a silver filler. Such a configuration allows easy and accurate formation of the wires and also enables the wires to have high conductivity.

In this aspect of the present invention, the touch sensor may further include an inextensible film covering the terminal. According to this aspect, since the touch sensor includes the inextensible film covering the terminal, the terminal can be protected by the inextensible film until the touch sensor is incorporated into a product. This prevents dirt or dust from adhering to the terminal.

In this aspect of the present invention, the inextensible film may be made of a heat-resistant resin having a deflection temperature under load of 200° C. or higher. According to this aspect, since the inextensible film is made of a heat-resistant resin having a deflection temperature under load of 200° C. or higher, the substrate film can hardly be deformed at the terminal if the substrate film with the inextensible film is subjected to forming. Such a configuration eliminates or minimizes cracking of the wires and the terminal protective layer provided at the terminal and a change in wire pitch.

One aspect of the present invention provides an electronic device including a housing and any of the above-described touch sensors, the touch sensor being disposed in the housing. According to this aspect, since the electronic device includes the housing and any of the above-described touch sensors disposed in the housing, the electronic device includes the touch sensor having the terminal exhibiting high wear resistance and high reliability.

One aspect of the present invention provides a method of producing a touch sensor shaped to include a body including a three-dimensionally shaped deformed portion having an operation surface in which a plurality of sensor electrodes are arranged and a tail projecting from the body and having a terminal to connect wires to a circuit board, the sensor electrodes and the wires being arranged on a single substrate film, the terminal having a terminal protective layer protecting the wires. The method includes forming the sensor electrodes, the wires, and the terminal protective layer on a single flat substrate film, affixing an inextensible film to an area including at least the terminal after formation of the sensor electrodes, the wires, and the terminal protective layer, and three-dimensionally forming a portion of the substrate film into the deformed portion.

The method according to this aspect of the present invention is the method of producing a touch sensor shaped to include a body including a three-dimensionally shaped deformed portion having an operation surface in which a plurality of sensor electrodes are arranged and a tail projecting from the body and having a terminal to connect wires to a circuit board, the sensor electrodes and the wires being arranged on a single substrate film, the terminal having a terminal protective layer protecting the wires. This method enables production of a three-dimensionally shaped touch sensor. The method includes forming the sensor electrodes, the wires, and the terminal protective layer on a single flat substrate film, affixing an inextensible film to an area including at least the terminal after formation of the sensor electrodes, the wires, and the terminal protective layer, and three-dimensionally forming a portion of the substrate film into the deformed portion. Since the sensor electrodes, the wires, and the terminal protective layer can be provided on the single flat substrate film with this method, these components can be easily formed in any manner including printing. Since the method includes affixing an inextensible film to an area including at least the terminal and three-dimensionally forming a portion of the substrate film into the deformed portion, the inextensible film covering at least the terminal eliminates or minimizes elongation of the substrate film at the terminal if the substrate film is elongated while being three-dimensionally formed. This prevents cracking of the wires and the terminal protective layer provided at the terminal and a change in wire pitch.

In this aspect of the present invention, the three-dimensionally forming may include forming a side wall simultaneously with formation of the deformed portion, the side wall being located at the boundary between the body and the tail and being raised from the tail. According to this aspect, since the side wall, which is located at the boundary between the body and the tail and is raised from the tail, can be formed simultaneously with formation of the deformed portion, the substrate film can be easily three-dimensionally formed. Although the side wall is located closer to the terminal than the deformed portion, the terminal, which is covered by the inextensible film, can hardly be deformed even in such a shape having the side wall formed by deforming a portion of the substrate film that is close to the terminal.

One aspect of the present invention provides a method of producing a touch sensor, the method including a first step of forming, on a flat substrate film, a plurality of sensors, a plurality of wires extending from the sensor electrodes, and a terminal protective layer protecting the wires, a second step of affixing an inextensible film to an area including at least a terminal provided on the substrate film, the terminal being configured to connect the wires to a connection target, and a third step of three-dimensionally forming a portion of the substrate film into a three-dimensionally shaped input detection portion having the sensor electrodes. According to this method, after the inextensible film is affixed to the terminal in the second step, three-dimensional forming is performed in the third step. This prevents elongation of the substrate film at the terminal covered with the inextensible film, thus preventing cracking of the wires and the terminal protective layer provided at the terminal and a change in wire pitch. This method may further include, before or after any of the steps, cutting the substrate film into a shape including a body having the sensor electrodes and a tail projecting from the body and having the terminal.

In this aspect of the present invention, the third step may include three-dimensionally forming a portion of the substrate film that is located between a body including the input detection portion and a tail having the terminal into a side wall that is raised from the tail. According to this aspect, the substrate film can be readily formed into a shape having the body including the three-dimensionally shaped input detection portion, the tail having the terminal, and the side wall raised from the tail. Although the side wall is raised from the tail, the terminal, which is covered with the inextensible film, can hardly be deformed.

Advantageous Effects of Invention

The touch sensor according to the present invention includes the terminal protective layer, which is thin and includes segments arranged at a fine pitch, and has little deformation of the substrate film at the terminal. The electronic device according to the present invention includes the touch sensor having the terminal exhibiting high reliability. The touch sensor producing method according to the present invention reduces or eliminates the likelihood that the terminal of the three-dimensionally formed touch sensor may be deformed.

BRIEF DESCRIPTION OF DRAWINGS

FIG. 6 illustrates a schematic configuration of a touch sensor according to a fourth embodiment, part 6A being a plan view of the touch sensor, part 6B being a sectional view of the touch sensor taken along line 6B-6B in part 6A.

DESCRIPTION OF EMBODIMENTS

Embodiments will be described below. Components common to the embodiments are designated by the same reference signs to omit redundant description. Redundant description of common materials, operations, and advantages will also be omitted. As used herein and in the claims, the terms "first", "second", and "third" are used to distinguish between different components and are not intended to describe a specific order or precedence.

Figure 1:
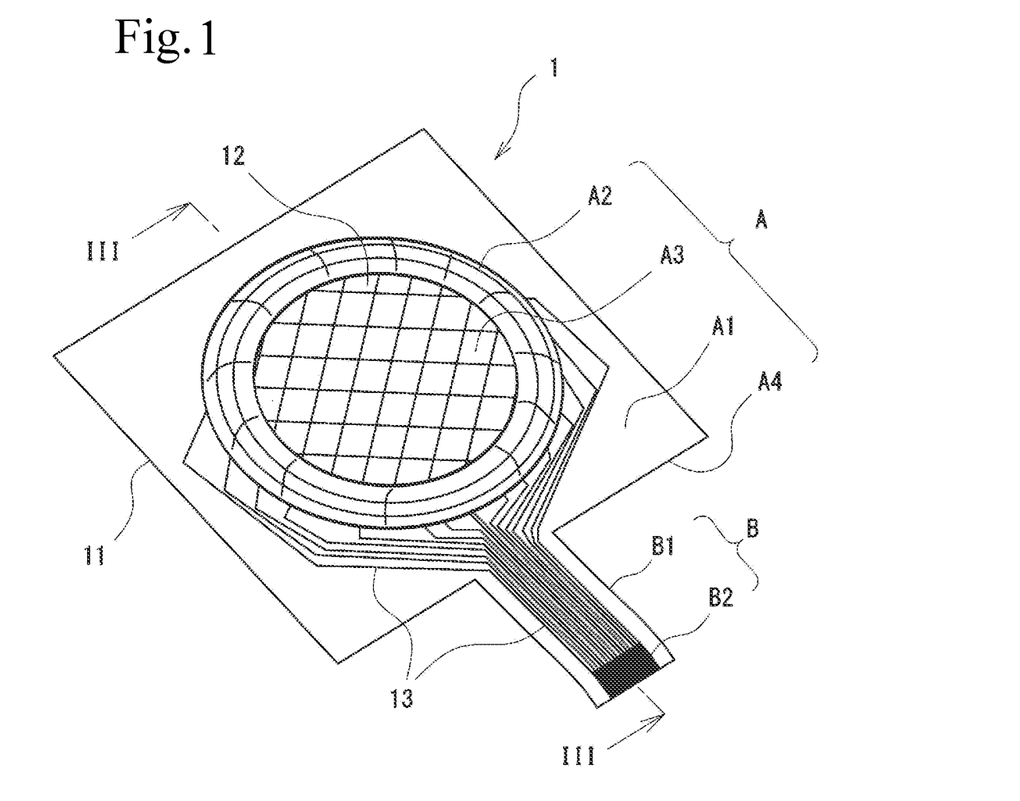
FIG. 1 is a schematic perspective view of a touch sensor according to a first embodiment.
Figure 2:
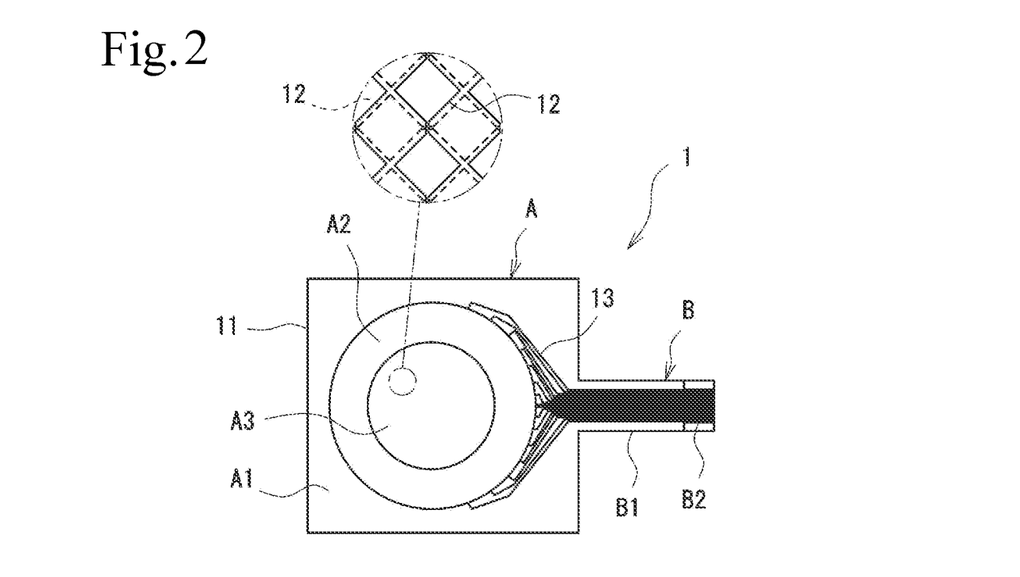
FIG. 2 is a schematic plan view of the touch sensor of FIG. 1.
Figure 3:
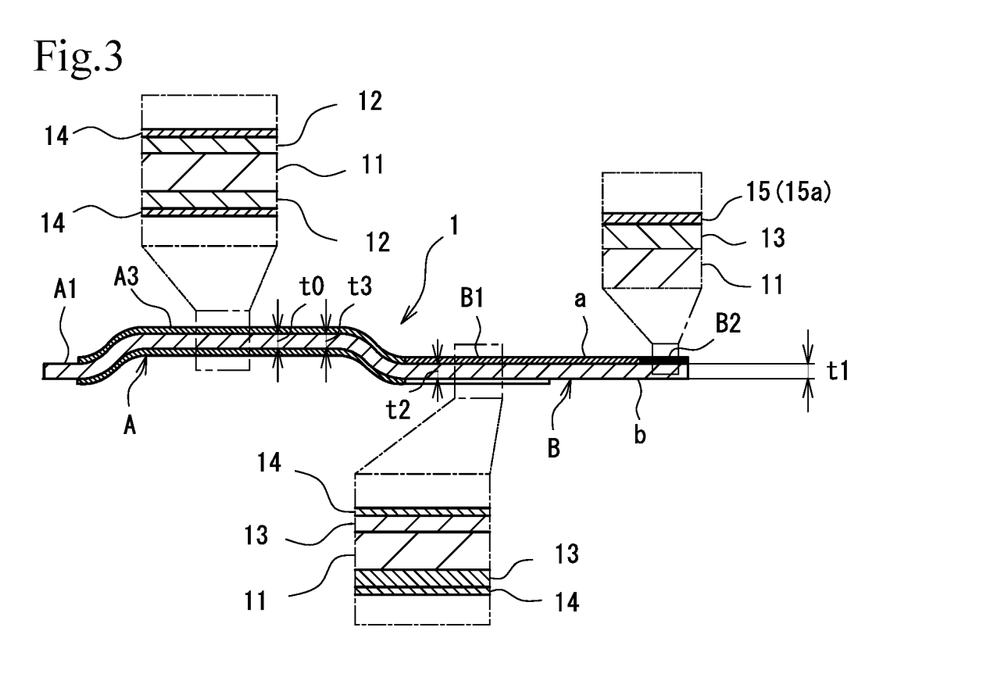
FIG. 3 is a sectional view of the touch sensor taken along line III-III in FIG. 1.

First Embodiment [FIGS. 1 to 3]

FIG. 1 is a schematic perspective view of a touch sensor 1, which will be described in the present embodiment. FIG. 2 is a schematic plan view of the touch sensor 1. FIG. 3 is a schematic sectional view of the touch sensor 1. For the shape of the touch sensor 1, as illustrated in FIGS. 1 to 3, the touch sensor 1 includes a body A having an operation surface A3, which a user touches with a finger or any other object to perform an operation, and a tail B, in which wires 13 are collected and bundled and are arranged at a high density, projecting from the body A and being to connect to a circuit board.

The body A includes a flat portion A1 like a flat sheet having no irregularities. The body A has, in its central part, a deformed portion A2 protruding from the flat portion A1 around the deformed portion A2 and having a three-dimensional shape. The operation surface A3 having a plurality of sensor electrodes 12 is located within the deformed portion A2. The deformed portion A2 and the operation surface A3 function as an "input detection portion" to detect an input on the touch sensor 1. The operation surface A3 is a flat circular surface located within the top of the deformed portion A2. The tail B is a projection projecting from an end A4 of the body A. The tail B has, at its distal end, a terminal B2, which can be inserted into or removed from a circuit board (not illustrated), serving as a separate member. The tail B, which is a rectangular projection, may have any other shape. One or more tails B may be provided.

The touch sensor 1 includes functionally the sensor electrodes 12 arranged in the operation surface A3. The wires 13 connecting to the sensor electrodes 12 extend continuously from the body A to the tail B and extend over a wire bundle portion B1 to the terminal B2. At the terminal B2, the wires 13 are covered with a terminal protective layer 15 formed by, for example, a carbon layer 15a.

For the structure of the touch sensor 1, the body A and the tail B are formed on a single substrate film 11. In the deformed portion A2, which is a raised part of the substrate film 11, the sensor electrodes 12 for detecting a touch of a finger, for example, are arranged on a front surface a and a rear surface b of the substrate film 11, as illustrated in a partial enlarged view included in FIG. 3. The sensor electrodes 12 are covered by resist layers 14 and are thus protected against, for example, external forces. The sensor electrodes 12 each have an end connected to the wires 13 at the boundary between the deformed portion A2 and the flat portion A1. As illustrated in another partial enlarged view included in FIG. 3, the wires 13 arranged in the wire bundle portion B1 are covered and protected by the resist layers 14. A connection in which the sensor electrodes 12 are in electrical communication with the wires 13 may be disposed at the perimeter of the flat portion A1 or a side wall A5 or may be disposed next to the tail B.

In the tail B, the wires 13 extending continuously from the body A are collected and bundled. The wires 13 arranged on the rear surface b of the substrate film 11 extend through though-holes (not illustrated) in the substrate film 11 and serve as the wires 13 arranged on the front surface a. The terminal B2 located at the distal end of the tail B is to be inserted into or removed from a "connection target". As illustrated in another partial enlarged view included in FIG. 3, the terminal protective layer 15 for protecting the wires 13 overlies the wires 13 at the terminal B2. A non-limiting example of the "connection target" is a connector of a circuit board included in an electrical apparatus.

Materials, functions, and other features of the components included in the touch sensor 1 will now be described. The substrate film 11 is a substrate of the touch sensor 1. If the substrate is required to have transparency, the substrate can be formed from a transparent resin film. The substrate film 11 is required to have such transparency that a display portion disposed on the rear surface of the touch sensor 1 is visible through the front surface a of the touch sensor 1.

The resin film is preferably stiff to some extent because the resin film supports the wires 13 and the sensor electrodes 12. Examples of the material of the resin film include, but are not limited to, polyethylene terephthalate (PET) resin, polyethylene naphthalate (PEN) resin, polycarbonate (PC) resin, polymethyl methacrylate (PMMA) resin, polypropylene (PP) resin, polyurethane (PU) resin, polyamide (PA) resin, polyether sulfone (PES) resin, polyether ether ketone (PEEK) resin, triacetyl cellulose (TAC) resin, polyimide (PI) resin, cycloolefin polymer (COP), and a blend or alloy containing any of the above-described resins.

The substrate film 11 has a thickness of preferably from 10 to 300 µm to maintain the shape of the touch sensor 1. The substrate film 11 may be subjected to surface treatment with, for example, a primer layer to enhance adhesion to conducting polymers, a surface protective layer, or an overcoat layer to prevent build-up of static electricity, for example.

The sensor electrodes 12 are formed from a conductive layer containing a conductive ink or a conductive polymer. A conductive polymer can be used to prepare a coating liquid, which allows formation by printing. The sensor electrodes 12 can preferably be formed by printing with such a coating liquid at a lower cost than using ITO, for example. If the sensor electrodes 12 do not have to be transparent, the sensor electrodes 12 may be formed by using a silver ink or paste containing a silver filler or a conductive ink, such as a carbon paste. A silver ink or a silver paste enables the sensor electrodes 12 to have low resistance and high sensitivity. A carbon paste enables the sensor electrodes 12 to be formed at a lower cost than using a conductive polymer and exhibits excellent weather resistance.

To form the sensor electrodes 12 as a transparent layer, a transparent conductive polymer is used. Examples of such a conductive polymer include, but are not limited to, polyparaphenylene, polyacetylene, and poly(3,4-ethylenedioxythiophene)-polystyrene sulfonate) (PEDOT-PSS). Alternatively, a conductive ink containing a silver filler in the form of nanoscale fine particles or fibers can be used to form a transparent layer.

The layer forming the sensor electrodes 12 has a thickness of preferably from 0.04 to 1.0 µm, more preferably from 0.06 to 0.4 µm. A layer thickness of less than 0.04 µm indicates that the sensor electrodes 12 may have a higher resistance. A layer thickness of greater than 1.0 µm indicates that the sensor electrodes 12 may have lower transparency. The layer thickness of the sensor electrodes 12 formed on the substrate film 11 can be measured by using an atomic force microscope (AFM).

The wires 13 allow the sensor electrodes 12 to be conductively connected to the circuit board of the electrical apparatus via the terminal B2. The wires 13 are preferably formed as a conductive coating layer formed from a conductive paste or ink containing a highly conductive metal, such as copper, aluminum, silver, or an alloy containing these metals. Among these metals and alloys, silver is preferably used to form the wires because silver is highly conductive and is less oxidizable than copper.

The wires 13 have a thickness of preferably from 1.0 to 20 µm. A thickness of less than 1.0 µm indicates that the resistance of the wires 13 may tend to rise, causing noise. A thickness of greater than 20 µm increases steps defined by the wires 13 and indicates that air bubbles may enter between the resist layer 14 and the wires 13 when the resist layer 14 is formed on the wires.

The wires 13 have a resistance of preferably 500Ω or less. A resistance of greater than 500Ω indicates that noise may increase, leading to lower sensitivity.

The resist layer 14 is an insulating film provided to prevent electrical communication between the sensor electrodes 12 and to protect the sensor electrodes 12 against, for example, ultraviolet rays and scratching, and is required to have transparency. Furthermore, the resist layer 14 is suitable to prevent sulfuration of the wires 13 formed from a silver ink or a silver paste or made of metal.

A hard resin is selected to form the resist layer 14. Examples of such a resin include acrylic, urethane, epoxy, polyolefin, and other resins.

The resist layer 14 has a thickness of typically from 1 to 30 µm, preferably from 5 to 20 µm. The reason is as follows. A thickness of greater than 30 µm indicates that the resist layer 14 has poor flexibility. A thickness of less than 1 µm indicates that the resist layer 14 may fail to sufficiently protect the sensor electrodes 12.

The terminal protective layer 15 is a conductive layer that has enough wear resistance to protect the wires 13. If the wires 13 are exposed, the wires 13 may undergo oxidization or migration. Under conditions where the wires 13 are exposed, repeated insertion/removal into/from the connector, serving as a connection target, may wear the wires 13, causing an increase in resistance and unstable conductive connection. The terminal protective layer 15 is preferably formed by the carbon layer 15a, which is hard and resistant to wear. The carbon layer 15a can be formed from a coating containing conductive carbon powder. The carbon layer 15a has a pencil hardness, measured in accordance with JIS K 5600-5-4, of preferably 2H or higher, more preferably 3H or higher. A pencil hardness of 2H is equivalent to a Mohs hardness of 2.

An inextensible film 16 can be made of a material having the same extensibility as the substrate film 11. The inextensible film 16 overlying the substrate film 11 leads to a greater thickness than that of only the substrate film 11 and thus inhibits elongation of the substrate film 11. However, the inextensible film 16 is more preferably formed by using a material that is less extensible than the substrate film 11. The inextensible film 16 may be formed by using a material selected from, for example, the above-described materials for the resin film forming the substrate film 11, paper, cellulose, cellophane, and metallic foil. The inextensible film 16 has an elongation, measured in accordance with JIS K 7127, of preferably 100% or less, more preferably 80% or less. The inextensible film 16 formed from an anisotropic material, such as an oriented film, has an elongation of preferably less than or equal to the above-described elongation in at least any direction.

A method for producing the touch sensor 1 will now be described. Raw materials of functional layers to be provided on the front surface a of the substrate film 11, or raw materials of the sensor electrodes 12, the wires 13, the resist layer 14, and the terminal protective layer 15 are prepared as liquid compositions so that these functional layers can be formed on the substrate film 11 by printing. These functional layers can be readily formed by printing these liquid compositions on the single flat substrate film 11.

The inextensible film 16 is then affixed to the substrate film 11 to cover at least one of the front and rear surfaces of at least a portion to be the terminal B2. After that, the substrate film 11 with the inextensible film 16 is placed into a forming mold to three-dimensionally form the substrate film 11 so that the operation surface A3 is located at the deformed portion A2 having a three-dimensional shape. Finally, the inextensible film 16 is removed from the substrate film 11, thus providing the touch sensor 1. A raw material of the substrate film 11 may be cut into a shape having the body A and the tail B at any of before printing of the functional layers, after printing of the functional layers, after affixing of the inextensible film 16, and after three-dimensional forming of the deformed portion A2.

The touch sensor 1 includes the terminal protective layer 15, which is thin and includes segments arranged at a fine pitch, without cracking of the terminal B2 and the terminal protective layer 15 caused by elongation and without a too large pitch. In other words, the terminal B2 is protected by the inextensible film 16 during the step of three-dimensionally forming the substrate film 11 formed from a single film material. This prevents the terminal B2 from being elongated when the tail B is pulled by elongation of the substrate film 11 during three-dimensional forming (of the deformed portion A2 and the operation surface A3) with the forming mold. For thicknesses of parts of the substrate film 11 measured after three-dimensional forming, a part (terminal-corresponding part T1) of the substrate film 11 that is located within an area T1 of the terminal B2 has a thickness t1, and the thickness t1 can be a maximum thickness of the entire substrate film 11. Or alternatively, the difference between the thickness t1 of the terminal-corresponding part (T1) and a thickness t0 at any position of a flat part T0, of the substrate film 11, other than the terminal-corresponding part T1 and having a maximum thickness can be 10% or less.

Similarly, the touch sensor 1 can be configured such that the substrate film 11 includes the terminal-corresponding part T1 having the thickness t1, a part T2 located in the tail B and 5 mm apart from the boundary between the tail B and the body A and having a thickness t2, and a part T3 located at any position in the body A and having a thickness t3 and such that the thickness t1 is greater than the thicknesses t2 and t3. Since the touch sensor 1 includes the substrate film 11 having such thicknesses, the touch sensor 1 has the terminal B2 exhibiting high reliability in thickness, wire pitch, and conductivity and also exhibits high sensitivity.

Figure 4:
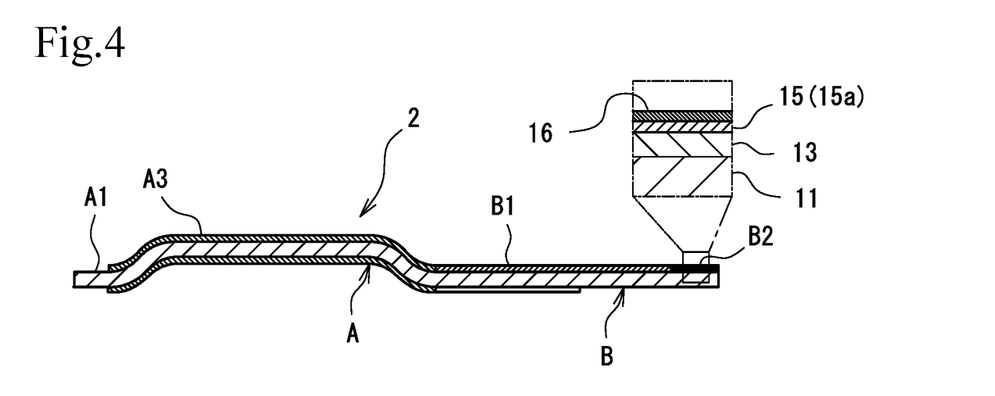
FIG. 4 is a sectional view, equivalent to FIG. 3, of a touch sensor according to a second embodiment.

Second Embodiment [FIG. 4]

FIG. 4 is a sectional view, equivalent to FIG. 3, of a touch sensor 2, which will be described in the present embodiment. As illustrated in a partial enlarged view included in FIG. 4, the touch sensor 2 includes the inextensible film 16, serving as a surface layer of the terminal B2. Specifically, the inextensible film 16 used in production is removed from the touch sensor 1 according to the first embodiment, whereas the inextensible film 16 is included as a component in the touch sensor 2. The inextensible film 16 overlies the terminal protective layer 15 at the terminal B2.

For the inextensible film 16, for example, a heat-resistant inextensible resin film can be used. The term "heat-resistant" as used herein refers to the ability of a material to withstand a heating temperature in three-dimensionally forming the substrate film 11 into the touch sensor 2 having an intended protrusion or hollow or to withstand a forming temperature in forming the touch sensor 2 integrally with a resin molded product to be, for example, an exterior component, such as a housing. For the substrate film 11 made of, for example, polycarbonate resin, the inextensible film 16 made of a heat-resistant resin having a deflection temperature under load of 200° C. or higher can withstand heat in forming the substrate film 11. For the material of the inextensible film 16, a polyimide film and an oriented PET film have a deflection temperature under load of 200° C. or higher. For example, a polyimide adhesive tape having, for example, an acrylic adhesive, is preferably used. The inextensible film 16 described in the second embodiment can be used in production of the touch sensor 1 according to the first embodiment. A deflection temperature under load is measured under a load of 1.80 MPa in accordance with JIS K 7191.

The touch sensor 2 can be produced in a manner similar to the touch sensor 1 according to the first embodiment. The terminal protective layer 15 on the surface of the terminal B2 or the surface thereof opposite the surface having the terminal protective layer 15 is covered by the inextensible film 16 sized to cover at least the terminal protective layer 15. The inextensible film 16 is included in the touch sensor 2, serving as a final product, without being removed during production.

The touch sensor 2 with such a configuration has the same advantages as those of the touch sensor 1. In addition, the inextensible film 16 included in the touch sensor 2 prevents dirt from adhering to the terminal B2 before actual use of the touch sensor 2. The inextensible film 16 is removed when the terminal B2 is inserted into the connector.

Modification

The touch sensor 2 can be configured such that the inextensible film 16 is provided on the rear surface b opposite the surface having the wires 13 at the terminal B2. The touch sensor 2 with such a configuration has the same advantages as those of the touch sensor 1.

Figure 5:
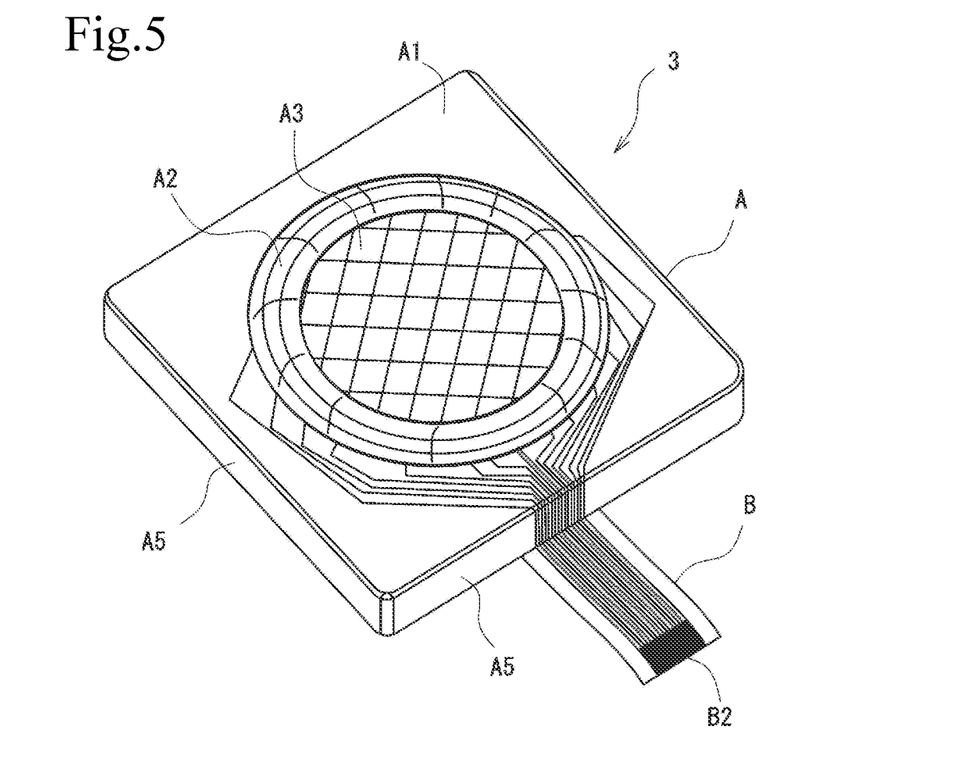
FIG. 5 is a schematic perspective view, equivalent to FIG. 1, of a touch sensor according to a third embodiment.

Third Embodiment [FIG. 5]

FIG. 5 is a schematic perspective view of a touch sensor 3, which will be described in the present embodiment. As illustrated in FIG. 5, the body A of the touch sensor 3 includes a side wall A5, which is located between the flat portion A1 of the body A and the tail B and is raised from the tail B to the flat portion A1. The touch sensor 3 differs from the touch sensor 1 according to the first embodiment having no side wall A5 in that the touch sensor 3 has the side wall A5.

The side wall A5 can be formed simultaneously with formation of the deformed portion A2. The side wall A5 formed by deforming the substrate film 11 is located closer to the terminal B2 than the deformed portion A2. The substrate film 11 can be deformed while the terminal B2 is covered with the inextensible film 16 in the same manner as in the production described in the first and second embodiments. This prevents elongation of the substrate film 11 at the terminal B2 and allows the terminal B2 of the touch sensor 3 to have high reliability in thickness, wire pitch, and conductivity.

Figure 6A:
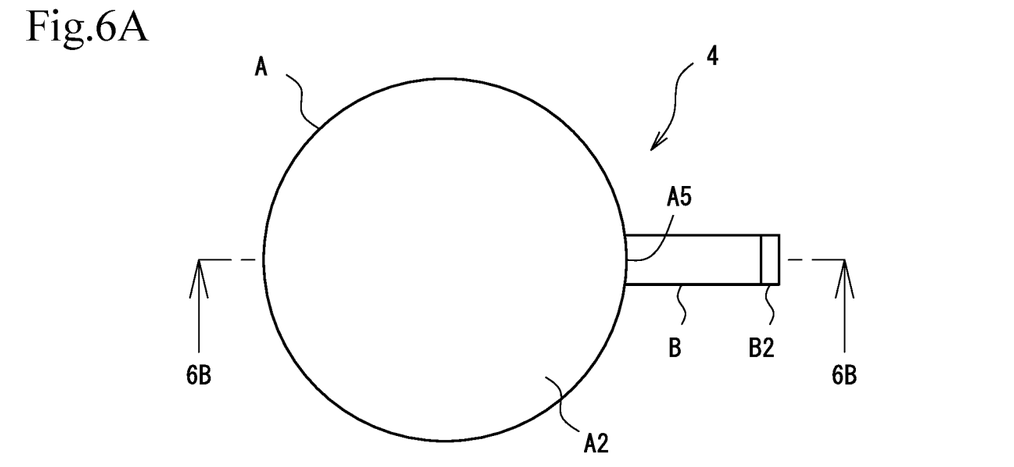
Figure 6B:
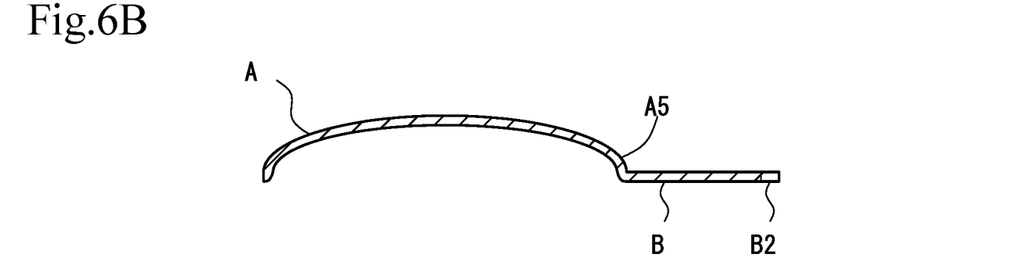

Fourth Embodiment [FIG. 6]

FIG. 6 illustrates a schematic configuration of a touch sensor 4, which will be described in the present embodiment, and illustrates the shape of the touch sensor 4. Part 6A is a plan view of the touch sensor 4. Part 6B is a sectional view of the touch sensor 4. As illustrated in FIG. 6, the body A of the touch sensor 4 includes no flat portion. Unlike the tail B, which is flat, the body A has a dome-like, curved overall shape. The boundary between such a dome-shaped portion and the tail B serves as the side wall A5 raised from the tail B. The touch sensor 4 differs from the touch sensors 1, 2, and 3 according to the other embodiments in that the touch sensor 4 includes no flat portion. In FIG. 6, which describes only the shape of the touch sensor 4, depiction of the functional parts, such as the wires 13 and the sensor electrodes 12, is omitted. The touch sensor 4 can be produced in the same manner as the touch sensors 1, 2, and 3 described in the other embodiments.

The above-described embodiments are merely examples of the present invention and should not be construed as limiting the present invention. The present invention includes any modifications of, for example, the shapes and materials of the components and methods of producing the components, that are within the spirit and scope of the present invention.

For example, in three-dimensionally forming the substrate film 11, the substrate film 11 can be formed integrally with an exterior component that is a resin molded product, such as an outer frame or a housing. Such an exterior component with the touch sensor can be readily used as, for example, a part of an instrument panel, a center console, a door arm rest, or a door trim of a vehicle, including the touch sensor 1, 2, 3, or 4, serving as an input unit.

Although the first to third embodiments illustrate the examples in which the deformed portion A2 is annular and the operation surface A3 is circular, the deformed portion A2 may be polygonal and the operation surface A3 may be a polygonal surface. Although the first to third embodiments illustrate the examples in which the operation surface A3 has a flat shape and extends at an upper end of the deformed portion A2, the operation surface A3 may be a hollow in the upper end of the deformed portion A2. Although the fourth embodiment illustrates the example in which the body A has a spherical shape, the body A may have a shape like a trapezoid or a truncated pyramid rather than a spherical shape.

EXAMPLES

Example 1

A touch sensor having the shape illustrated in FIG. 5 was produced. The thicknesses of predetermined parts, which will be described in detail later, of a substrate film were measured. The touch sensor was formed as follows: a polycarbonate film having a thickness of 250 μm was used, and 34 wires extending from a body to a tail were formed by printing with a silver paste such that the wires in the tail had a width of 0.1 mm and a pitch of 0.5 mm.

A terminal was provided in the tail such that the terminal had a proximal end located at a distance of 26.5 mm from the boundary between the tail and the body and had a distal end located at a distance of 30 mm from the boundary. A terminal protective layer was then formed at the terminal by printing with a carbon paste such that each wire in an area corresponding to the terminal was covered by the carbon paste having a width of 0.3 mm. The tail had a width of 22 mm.

Three inextensible films each formed from a polyimide adhesive tape having an acrylic adhesive and having a thickness of 150 μm were stacked and affixed to a surface, of the terminal, having the terminal protective layer in such a manner that the whole of the terminal was covered by the inextensible films extending from a position closer to the body by 12 mm than the proximal end of the terminal. Sample 1 was produced in the above-described manner. Sample 2 having no inextensible film was produced.

Then, each of Sample 1 and Sample 2 was placed into a forming mold for vacuum forming, thus forming a touch sensor. Each of the touch sensors of Sample 1 and Sample 2 included side walls and a body surrounded by the side walls and including a flat portion and a deformed portion located at its central part. The side walls had a height of 9 mm and a dimension of 75 mm in a direction along the width of the tail. The top of the deformed portion protruding from the flat portion had a height of 1 mm. In this experiment, formation of sensor electrodes and resist layers was omitted for simplification.

Figure 7:
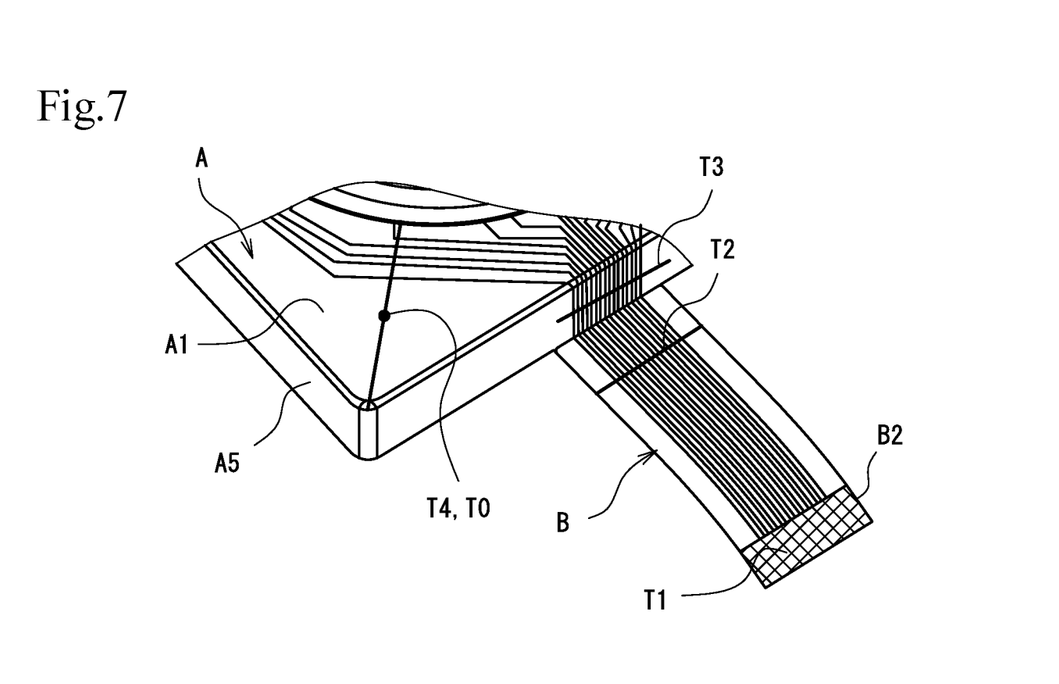
FIG. 7 illustrates thickness measurement sites in a substrate film of a touch sensor produced in EXAMPLE 1.

For these samples obtained in the above-described manner, the thicknesses of the parts of each substrate film were measured. As illustrated in FIG. 7, measurement sites corresponded to a part located within the terminal (T1: the above-described "terminal-corresponding part"), a part (T2) located in the tail and 5 mm apart from the boundary between the tail and the body, a part (T3) located at the side wall, and a part (T4) located in the flat portion and at the midpoint of an imaginary line connecting the deformed portion to a corner or an intersection between the side walls. Let t1, t2, t3, and t4 denote the thicknesses of the parts T1, T2, T3, and T4 of the substrate film, respectively. In each of the sites, thicknesses were measured at three positions selected randomly. The following table describes averages of measurements in the sites.

TABLE 1

| | Measurement Site | Before Forming (μm) | After Forming (μm) | Change | Difference from Maximum Thickness of Part Except T1 |
|---|---|---|---|---|---|
| Sample 1 | T1 | 250 | 237 | −5% | 3% |
| | T2 | 250 | 196 | −22% | −15% |
| | T3 | 250 | 191 | −24% | −17% |
| | T4 | 250 | 231 | −8% | 0% |
| Sample 2 | T1 | 250 | 209 | −17% | −11% |
| | T2 | 250 | 192 | −23% | −18% |
| | T3 | 250 | 203 | −19% | −13% |
| | T4 | 250 | 234 | −6% | 0% |

In each of Sample 1 and Sample 2, the thicknesses of the parts of the substrate film in the different sites of the touch sensor were measured. The part T4 was a part that was other than the part T1 located within the terminal and that had a maximum thickness of the substrate film.

As illustrated in Table 1, the measured thicknesses of the substrate film in Sample 1 demonstrate that, in the touch sensor produced by using the inextensible films covering the terminal, the difference between the thickness t1 of the part T1, of the substrate film, located within the terminal and the thickness t0 of the "part (T4) located in the flat portion and at the midpoint of the imaginary line connecting the deformed portion to the corner or intersection between the side walls", or the part that was other than the part T1 and had a maximum thickness of the substrate film, is less than or equal to 10%. Comparison between the thickness t1 of the part T1, of the substrate film, located within the terminal, the thickness t2 of the part T2, of the substrate film, located in the tail and 5 mm apart from the boundary between the tail and the body, and the thickness t3 of the part T3, of the substrate film, at the side wall demonstrate that the thickness t1 is greater than the thicknesses t2 and t3. The touch sensor of Sample 1 had no break or elongation of the terminal protective layer, which was provided at the terminal and was formed by the carbon layer, before and after three-dimensional forming of the substrate film, and also had no change in wire pitch.

In contrast, in the touch sensor of Sample 2 produced without using the inextensible film for covering the terminal, the difference between the thickness t1 of the part T1, of the substrate film, located within the terminal and the thickness t0 of the "part (T4) located in the flat portion and at the midpoint of the imaginary line connecting the deformed portion to the corner or intersection between the side walls", or the part that was other than the part T1 and had a maximum thickness of the substrate film, is greater than 10%. The touch sensor of Sample 2 had breaks and elongations of some segments of the terminal protective layer, provided at the terminal and formed by the carbon layer, covering the wires before and after three-dimensional forming of the substrate film, and also had an increase in wire pitch.

Example 2

A touch sensor having the shape illustrated in FIG. 6 was produced in the same manner as in EXAMPLE 1. The thicknesses of parts of a substrate film of the touch sensor were measured. A tail had the same size and shape as those in EXAMPLE 1. For the size and shape of a body, the body had a circular shape in plan view and a diameter of 70 mm and was dome-shaped such that the top of the body was 10 mm higher than the tail. As in EXAMPLE 1, the touch sensor with inextensible films was produced as Sample 3, and the touch sensor with no inextensible film was produced as Sample 4.

For Samples 3 and 4 produced in the above-described manner, the thicknesses of the parts of each substrate film were measured in the same manner as in EXAMPLE 1. Measurement for 14 was omitted because the substrate film had no part corresponding to the part 14. The part T3 was located in the body and 5 mm apart from the boundary between the body and the tail. Let t1, t2, and t3 denote the thicknesses of the parts T1, T2, and T3 of the substrate film, respectively. In each of the sites, thicknesses were measured at three positions selected randomly. The following table describes averages of measurements in the sites.

TABLE 2

| | Measurement Site | Before Forming (μm) | After Forming (μm) | Change | Difference from Maximum Thickness of Part Except T1 |
|---|---|---|---|---|---|
| Sample 3 | T1 | 250 | 237 | −5% | 0% |
| | T2 | 250 | 196 | −22% | −17% |
| | T3 | 250 | 191 | −24% | −19% |

TABLE 2-continued

| | Measurement Site | Before Forming (μm) | After Forming (μm) | Change | Difference from Maximum Thickness of Part Except T1 |
|---|---|---|---|---|---|
| Sample 4 | T1 | 250 | 209 | −17% | 0% |
| | T2 | 250 | 192 | −23% | −8% |
| | T3 | 250 | 203 | −19% | −3% |

In each of Sample 3 and Sample 4, the thicknesses of the parts of the substrate film in the different sites of the touch sensor were measured. The part T1 located within the terminal had a thickness greater than those of the other parts. For the measured thicknesses of the substrate film in Sample 3, or the touch sensor produced by using the inextensible films covering the terminal, as illustrated in Table 2, comparison between the thickness t1 of the part T1, of the substrate film, located within the terminal, the thickness t2 of the part T2, of the substrate film, located in the tail and 5 mm apart from the boundary between the tail and the body, and the thickness t3 of the part T3, of the substrate film, located in the body and 5 mm apart from the boundary between the tail and the body demonstrates that the thickness t1 is greater than the thicknesses t2 and t3. The touch sensor of Sample 3 had no break or elongation of the terminal protective layer, which was provided at the terminal and formed by the carbon layer, before and after three-dimensional forming of the substrate film, and also had no change in wire pitch.

The relationship between the thicknesses in the three sites of Sample 3 is T1>T2>T3, whereas the relationship between the thicknesses in the three sites of Sample 4 is T1>T3>T2, which indicates that the relationship between the thickness t2 of the part T2, of the film, in the tail other than the terminal and the thickness t3 of the part T3, of the film, at the side wall was reversed. The touch sensor of Sample 4 had breaks and elongations of some segments of the terminal protective layer, provided at the terminal and formed by the carbon layer, covering the wires before and after three-dimensional forming of the substrate film, and also had an increase in wire pitch.

REFERENCE SIGNS LIST

1, 2, 3, 4 touch sensor
A body
A1 flat portion
A2 deformed portion (input detection portion)
A3 operation surface (input detection portion)
A4 end
A5 side wall
B tail
B1 wire bundle portion
B2 terminal
11 substrate film
12 sensor electrode
13 wire
14 resist layer
15 terminal protective layer
15a carbon layer
16 inextensible film
a front surface
b rear surface

The invention claimed is:

1. A touch sensor having a plurality of sensor electrodes and a plurality of wires on a substrate film, the touch sensor comprising:
a body including a three-dimensionally shaped input detection portion in which the sensor electrodes are arranged; and
a tail projecting from the body and having a terminal to connect the wires to a connection target,
wherein the terminal has a terminal protective layer protecting the wires, and
wherein the substrate film includes a part T1 located within the terminal and having a thickness t1, and the thickness t1 is a maximum thickness of the entire substrate film.

2. A touch sensor having a plurality of sensor electrodes and a plurality of wires on a substrate film, the touch sensor comprising:
a body including a three-dimensionally shaped input detection portion in which the sensor electrodes are arranged; and
a tail projecting from the body and having a terminal to connect the wires to a connection target,
wherein the terminal has a terminal protective layer protecting the wires, and
wherein the substrate film includes a part T1 having a thickness t1 located within the terminal and a flat part T0 having a maximum thickness other than the part T1, and a difference between the thickness t1 and a thickness t0 at any position of the flat part T0 is less than or equal to 10%.

3. The touch sensor according to claim 1, wherein the body includes a side wall located at a boundary with the tail and raised from the tail.

4. The touch sensor according to claim 3, wherein the substrate film includes the part T1 located within the terminal and having the thickness t1, a part T2 located in the tail and 5 mm apart from the boundary between the tail and the body and having a thickness t2, and a part T3 located at the side wall and having a thickness t3, and the thickness t1 is greater than the thicknesses t2 and t3.

5. The touch sensor according to claim 1, further comprising:
an insulating resist layer that covers the wires arranged on the tail other than the terminal.

6. The touch sensor according to claim 1, wherein the terminal protective layer is a carbon layer containing conductive carbon powder and having a pencil hardness of 2H or higher.

7. The touch sensor according to claim 1, wherein the wires comprise a conductive coating layer containing a silver filler.

8. The touch sensor according to claim 1, further comprising:
an inextensible film covering the terminal.

9. The touch sensor according to claim 8, wherein the inextensible film comprises a heat-resistant resin having a deflection temperature under load of 200° C. or higher.

10. An electronic device comprising:
a housing; and
the touch sensor according to claim 1 disposed in the housing.

11. A method of producing a touch sensor, the method comprising:
a first step of forming, on a flat substrate film, a plurality of sensor electrodes, a plurality of wires extending from the sensor electrodes, and a terminal protective layer protecting the wires;
a second step of affixing an inextensible film to an area including at least a terminal provided on the substrate film, the terminal being configured to connect the wires to a connection target; and
a third step of three-dimensionally forming a portion of the substrate film into a three-dimensionally shaped input detection portion having the sensor electrodes.

12. The method according to claim 11, wherein the third step includes three-dimensionally forming a portion of the substrate film that is located at a boundary between a body including the input detection portion and a tail having the terminal into a side wall that is raised from the tail.

13. The touch sensor according to claim 2, wherein the body includes a side wall located at a boundary with the tail and raised from the tail.

14. An electronic device comprising:
a housing; and
the touch sensor according to claim 2 disposed in the housing.

* * * * *